United States Patent [19]
Osovets

[11] Patent Number: 6,125,440
[45] Date of Patent: Sep. 26, 2000

[54] STORING EXECUTING INSTRUCTION SEQUENCE FOR RE-EXECUTION UPON BACKWARD BRANCH TO REDUCE POWER CONSUMING MEMORY FETCH

[75] Inventor: Alexander Osovets, Ashburn, Va.

[73] Assignee: Tellabs Operations, Inc., Lisle, Ill.

[21] Appl. No.: 09/082,654

[22] Filed: May 21, 1998

[51] Int. Cl.[7] ........................................ G06F 9/44
[52] U.S. Cl. ................ 712/205; 712/241; 711/109
[58] Field of Search .................... 712/205, 241; 711/109, 110

[56] References Cited

U.S. PATENT DOCUMENTS

| | | | |
|---|---|---|---|
| 3,337,851 | 8/1967 | Dahm | 711/117 |
| 4,171,539 | 10/1979 | Tawfik et al. | 713/324 |
| 4,409,665 | 10/1983 | Tubbs | 713/321 |
| 4,615,005 | 9/1986 | Maejima et al. | 713/601 |
| 4,626,988 | 12/1986 | George | 712/241 |
| 4,748,559 | 5/1988 | Smith et al. | 713/601 |
| 4,780,843 | 10/1988 | Tietjen | 713/322 |
| 4,851,987 | 7/1989 | Day | 713/601 |
| 5,029,126 | 7/1991 | Yamaguchi | 365/49 |
| 5,083,266 | 1/1992 | Watanabe | 713/601 |
| 5,276,824 | 1/1994 | Skruhak et al. | 712/212 |
| 5,359,569 | 10/1994 | Fujita et al. | 365/229 |
| 5,495,617 | 2/1996 | Yamada | 713/323 |
| 5,544,082 | 8/1996 | Garcia-Duarte et al. | 713/321 |
| 5,579,493 | 11/1996 | Kiuchi et al. | 712/207 |
| 5,625,826 | 4/1997 | Atkinson | 713/322 |
| 5,634,061 | 5/1997 | Horie et al. | 713/324 |
| 5,638,083 | 6/1997 | Margeson | 345/10 |

FOREIGN PATENT DOCUMENTS

0511484  11/1992  European Pat. Off. .

*Primary Examiner*—Kenneth S. Kim
*Attorney, Agent, or Firm*—Dann, Dorfman, Herrell and Skillman, P.C.

[57] ABSTRACT

A controller for a digital processor includes a random access memory, e.g., an instruction memory, that consumes significant power when operating. To reduce the power consumption when repetitive instructions, i.e. loops, are being performed, the instructions being executed are stored in a shift register and, when a jump-back instruction is executed, the instructions, including those in the loop, are then accessed from the shift register rather than from the random access memory without any additional special instructions that define the characteristics of the loop. A memory control includes a state tracking machine that monitors the execution of the program instructions and determines from the execution of a jump-back instruction that a loop may have been entered, whereupon it enables the shift register to produce the instructions stored therein and disables the instruction memory from producing instructions that are stored in the shift register. The foregoing process preferably is automatically initiated for each loop, whether the loop is a new loop, a loop within a loop or a multiple loop.

50 Claims, 4 Drawing Sheets

STORING EXECUTING INSTRUCTION SEQUENCE FOR RE-EXECUTION UPON BACKWARD BRANCH TO REDUCE POWER CONSUMING MEMORY FETCH

The present invention relates to a controller for a digital processor and, in particular, to a controller for reducing power consumption of the processor under certain operating conditions.

Digital processors are used in a wide variety of applications in consumer, industrial, entertainment, telecommunications, computing and other electronic equipment. A digital processor ordinarily comprises a control unit or controller, a memory such as a Random Access Memory (RAM) and an execution unit. The instructions to be performed by the processor are stored in the memory and are read out under the control of the controller and are then acted upon or executed in the execution unit. Where a processor is intended for a wide variety of applications generally requiring arithmetic and/or logic operations, it may be referred to as a micro-processor, and where it is intended for a specific application, such as processing particular digital signals as in a digital filter, it is referred to as a digital signal processor. As used herein, the term "digital processor" is intended to refer to either a digital micro-processor, a digital signal processor or both.

As technology progresses there is a desire to include greater and greater function into smaller and smaller equipment. This is enabled by technology that reduces the size of components and by technology that incorporates a plurality of components into a single component such as an integrated-circuit micro-processor. To accommodate the demand for greater capability in smaller size, more and more functions are being performed by micro-processors which are themselves being improved in terms of increased operating speeds as well as larger chip sizes necessary to accommodate greater numbers of computing elements. As a result, with more and more functions being performed on a single chip, or by a small number of integrated circuit chips, power consumption on those integrated circuit chips has become a serious problem. Part of this problem relates to the removal of heat from the integrated circuit chips because heat that produces excessive temperature increase will result in a lessening of reliability at best, and a device failure at worst. The problem is compounded in portable and mobile equipment that operates from a battery in that increased power consumption results in greater battery drain which in turn means that either a larger, bulkier and heavier battery will be required or that the operation time under a single battery charge will decrease severely. Both of these outcomes are unsatisfactory to users of such equipment.

Accordingly, it is desirable that the power consumed by digital processors be reduced. Digital processors are commonly manufactured in metal-oxide-semiconductor (MOS) integrated circuits, such as complementary-metal-oxide-semiconductor (CMOS) integrated circuits which consume virtually no power when the logic circuitry thereon is in a stable condition. When data is being processed or instructions are being executed, the circuitry changes state and it is during these transitions that substantial power is consumed. Because power is consumed mainly during transitions, it follows that when higher operating speeds are employed the transitions become both more frequent and a larger percentage of the total time and so the total power consumption increases in direct relationship to operating frequency. One of the most power consuming portions of a digital processor is the RAM in which micro-code instructions and data are stored. The highest power consumption in this RAM occurs when information is being read into the memory or is being read out of the memory.

Under certain conditions, however, the processor is merely awaiting the occurrence of an event such as the entry of a key stroke, the arrival of data from another source, an interrupt signal, a frame pulse, a channel pulse, or some other event of frequency and timing which are uncertain. In that condition, the digital processor will continue to operate at normal speed, consuming full power, when no useful processing or data manipulation is being accomplished. Digital processor power would be substantially reduced if the accessing of the instruction memory (RAM) is minimized or eliminated during these times of waiting.

One of the most common techniques to do this is to stop the operation of the entire digital processor or to stop parts of its circuitry when no operation is required, for example, by switching off the power to the circuit or by stopping the clock. But this requires either an interrupt signal or a reset signal in order to resume operation, which is undesirable because of the processing overhead necessary to accomplish the restoration of operation and/or the need for special instructions to accomplish that restoration.

U.S. Pat. No. 5,579,493 entitled "System With Loop Buffer and Repeat Control Circuit Having Stack for Storing Control Information" issued to Kiuchi et al. describes a low power data processor which includes an instruction buffer for storing an instruction module, i.e. a set of instructions to be repeatedly executed, in place of accessing the instruction memory (RAM) to fetch that instruction module on a repetitive basis. Kiuchi et al. requires, however, that a special instruction follow each instruction module that is to be repeatedly executed. This special instruction specifies the predetermined number of times that the system is to branch to the head (starting) address of the instruction module to be repeatedly executed. Because the special instruction of Kiuchi et al. follows the instruction module, the module is read out from the RAM in its first repetition and is then again read out from the instruction memory in its second execution during which it is written into an instruction buffer. On subsequent repetitions, it is read out from the instruction buffer. As a result, the power reduction due to avoidance of accessing the instruction memory cannot be realized until the third repetition of each particular instruction module.

European Patent Application EP 0 511 484 A2 entitled "Loop Control In A Data Processor" issued to Okado et al. is a data processor including an instruction decoder for decoding a specific repeat instruction which is read from the read only memory (ROM) to cause the specific instructions following the repeat instruction to be executed repeatedly. The repeat controller reads these instructions in series from the micro ROM and places them into instruction registers for subsequent repeated execution. Okado et al. requires a special repeat instruction that precedes each group of instructions that are to be executed repeatedly. The special repeat instruction of Okado et al. specifies the number of steps or instructions that are to be repeatedly executed and the predetermined number of times the subsequent instructions are to be repeated.

Both Kiuchi et al. and Okado et al. require a special instruction which defines the instructions to be repeatedly executed. As a result, if the programmer or operator forgets the special instruction or improperly inputs data into it, the data processor will not work properly and/or the intended power savings will not be realized. This is further complicated by requiring that upon making a program change, the programmer must not only change the executable instruction, but must also change the special repeat instruction if proper operation and the attendant reduction of power consumption is to be realized.

Accordingly, it is desirable that an arrangement for reduction of power consumption in a digital processor by reducing the power consumption of its memory be available, and that it operate directly from the execution instructions of the program code rather than from a special instruction defining the loop to be repeatedly executed. It is further desirable that this arrangement be able to accommodate multiple loops within the code as well as nested loops without requiring overhead processing and without any special programming instruction.

A digital processor control according to the present invention comprises a memory adapted to store instructions to be executed where such instructions may include at least one sequence of instructions that are to be executed more than one time. The memory produces ones of the stored instructions in accordance with a first control signal. A register is coupled to the memory to store a sequence of instructions produced by the memory and is responsive to a second control signal to produce ones of the sequence of instructions stored in the register. A control device detects ones of the instructions produced by the memory and the register that initiate repetition of the sequence of instructions that are to be executed more than one time. A state machine responds to the control device to generate the first control signal when instructions to be executed more than one time are not detected and to generate the second control signal when the instructions to be executed more than one time are detected.

A digital controller comprises an addressable memory to produce instructions when enabled and a shift register to store instructions produced by the addressable memory and to produce the stored instructions when enabled. A controller decodes executable instructions produced by the addressable memory and the shift register, wherein the decoded instructions include jump-back instructions and jump-forward instructions. An instruction address and a target address is associated with each jump-back and jump-forward instruction. A memory control has a mapping state in which the shift register is enabled and a non-mapping state in which the addressable memory is enabled. The memory control is responsive to the controller to take the mapping state when a jump-back instruction is decoded and to take the non-mapping state when a jump-forward instruction is decoded.

A method for reducing power consumption in a digital processor comprises the steps of:

producing from a memory a sequence of executable instructions to be executed, including a shorter sequence of executable instructions to be repetitively executed;

storing in a register the shorter sequence of executable instructions to be repetitively executed;

decoding ones of the sequence of executable instructions that are jump-back instructions;

disabling in response to decoding of the jump-back instruction the memory from producing further instructions in the sequence of executable instructions; and producing in response to the decoding of the jump-back instruction from the register and executing ones of the shorter sequence of executable instructions stored therein.

DESCRIPTION OF THE PREFERRED EMBODIMENT

In the Drawing, paths for digital signals having one bit are generally shown as single line arrows and paths for digital signals including multiple bits in parallel are generally shown as broad arrows, however, serial information, serial bits and words may be transmitted over a path shown by either a single line arrow or a broad arrow. The following instructions and abbreviations are used in the description herein.

"JMP−" means an instruction to "jump" backward from the present instruction to an instruction prior in the sequence of instructions to be executed, i.e. an instruction having a lower address number.

"JMP+" means an instruction to "jump" forward from the present instruction to an instruction that is later in the sequence of instructions to be executed, i.e. an instruction having a higher address number.

"ADDR" means an address of an instruction to be executed.

"JMP_ADDR" means the address in a jump instruction (JMP+ or JMP−) specifying the address to which the instruction sequence should next go to. This is sometime referred to as a "target address".

MEM_ADDR means a memory access signal specifying the address of a register in the memory from which information stored therein is to be read out or fetched when the memory is enabled.

MEM_EN means a memory enable signal which when present enables the memory to be accessed and data stored in the registers thereof to be produced at an output or fetched in accordance with a memory address signal.

SH_EN means a shift enable signal which when present enables a shift register to store in its registers (shift in) the information present at its data input.

CE1 means a chip enable signal which when present enables a shift register to produce at its output (or fetch) data stored in a particular stage of that shift register having an address corresponding to a shift register address signal.

SRB_ADDR means a shift register address signal specifying the stage of the shift register from which information is to be produced at the output of the shift register (or fetched) when the shift register is enabled.

CN_EN means a counter enable signal which enables a counter to count signals received at its input.

CN_RST means a counter reset signal which causes the count stored in a counter to become a predetermined number, usually zero unless specified otherwise.

LD_EN means a load enable signal which enables a register to accept and store or load the information present at its data input.

COMP means a comparator. In the drawing, a comparator has a "greater than" (>) or "greater than or equal" ($\geq$)

symbol or a "less than" (<) or "less than or equal" (≤) symbol which indicates that when the function of the comparator is written out as an equation, the data present at the upper most input of the comparator appears in the left side of the equation separated from the data present at the lower most input, which appears in the right side of the equation and those two quantities are separated by the symbol contained within the box designating the comparator.

Figure 1:
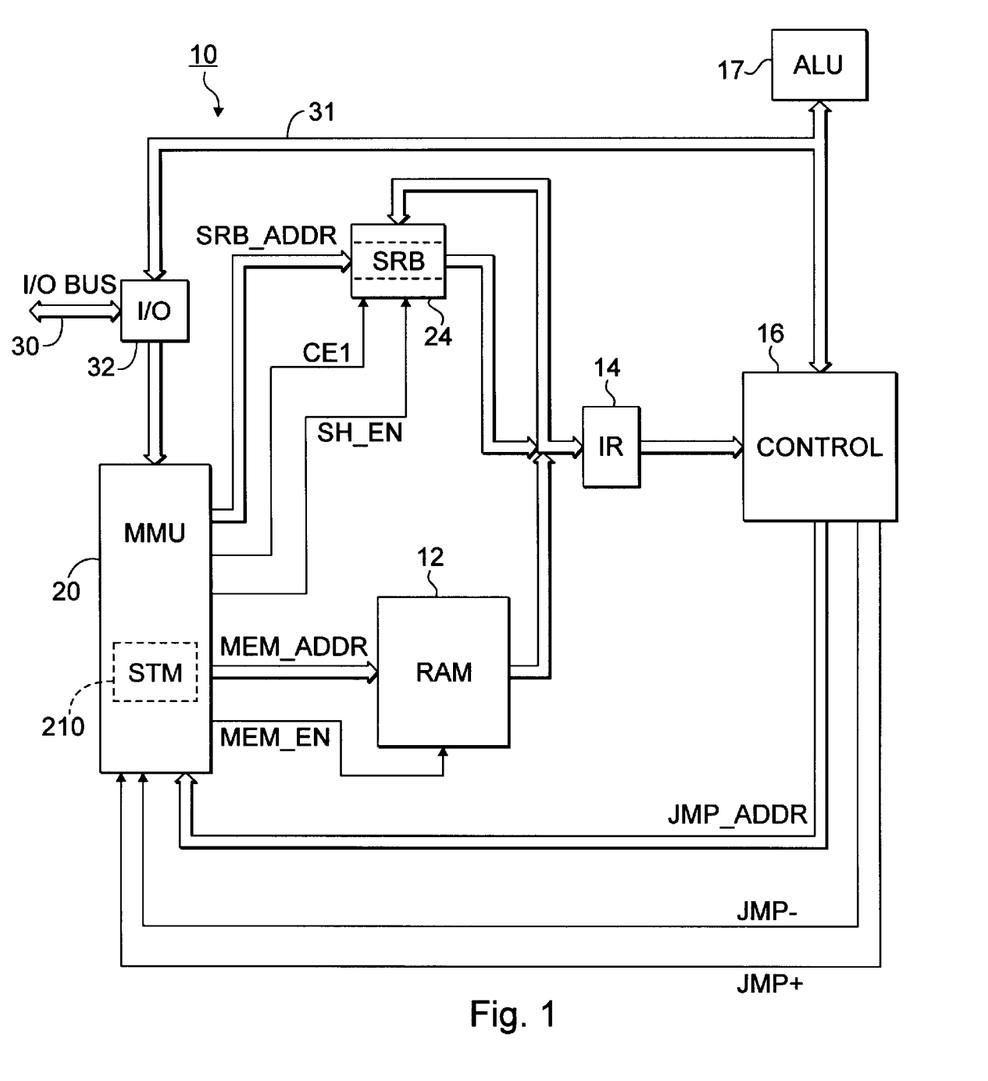
FIG. 1 is a schematic block diagram of a controller for a digital processor including an embodiment according to the present invention.

In FIG. 1, controller 10 for a digital processor includes a Random Access Memory (RAM) 12 in which executable instructions are stored, which instructions may be fetched into an Instruction Register (IR) 14 and decoded by control 16 for controlling the execution of such instructions. The instructions decoded by control 16 are sent via a data bus to the execution unit or arithmetic logic unit ALU 17 for execution. Instructions decoded by control 16 are further sent to the Memory Management Unit (MMU) 20 for controlling RAM 12. As thus far described, processor 10 retrieves all instructions to be executed from RAM 12, even where instructions are repetitively executed or where the processor is merely awaiting for an event or data input. Data is communicated to or from processor 10 via input/output (I/O) bus 30 and is communicated within processor 10 via input/output (I/O) unit 32 and data bus 31.

The sequence of instructions to be executed by the digital processor, commonly referred to as a program, is a series of micro-code instructions that are stored in the random access memory 12. Prior to operation of the processor, the instructions are passed into the controller via the I/O bus 30 through the I/O unit 32 and are directed then through the memory management unit 20 and into random access memory 12 where they are stored until called upon for execution, as is conventional. To avoid clutter in the accompanying drawing and to preserve clarity with regard to the present invention, the control signals and signal paths employed solely in loading programs and micro-code into RAM 12 are not shown.

Figure 2:
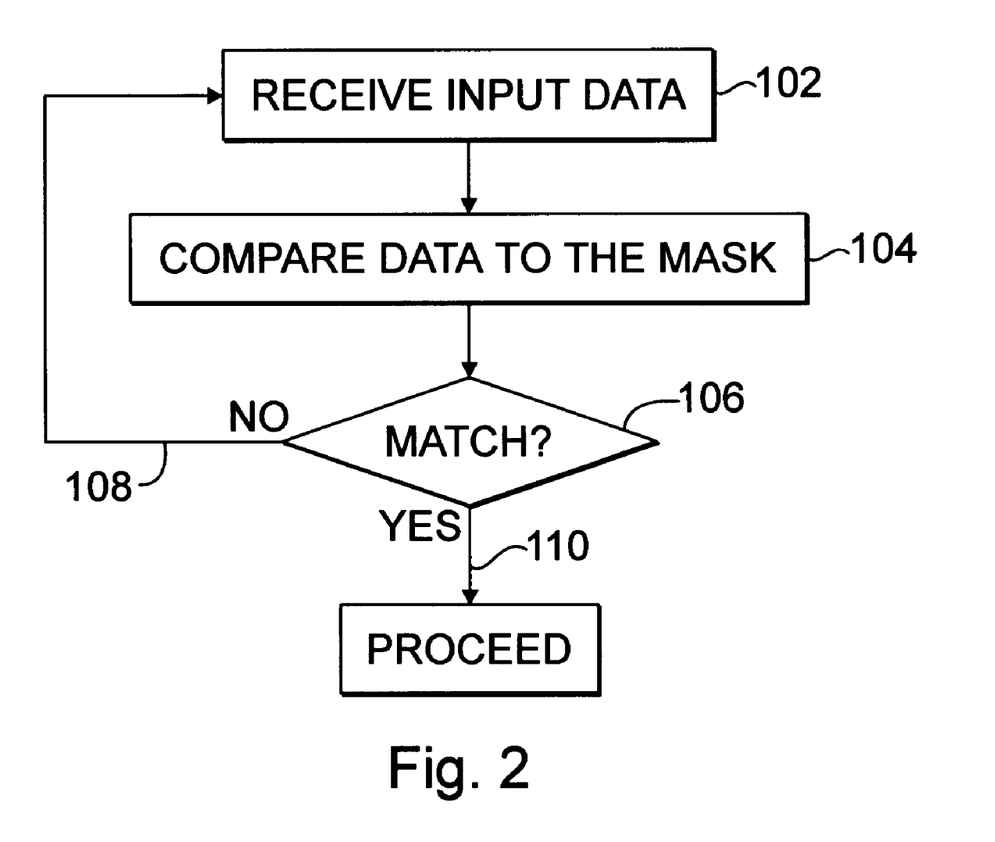
FIG. 2 is a logic flow diagram of a loop.

FIG. 2 is a flow diagram of a processing loop known variously as a "tight loop" or as a "wait loop". In the condition represented by block 102 Receive Input Data, the processor is waiting for a particular piece of information or signal to arrive. It periodically compares the data it last received to a mask or template represented by block 104 and executes the decision shown in the block 106, Match? If the input data received does not match that of the mask, the loop proceeds along the "No" path 108 and repeats the cycle. The cycle continues to be repeated until the input data received does match that of the mask 104 in which case the comparison function 106 yields a true result and the flow proceeds along the "Yes" path 110 to proceed with further processing. While this type of loop might be intended to be performed a particular number of times or might be intended to be performed for a particular period of time, it is also common that the loop is to await a particular event, such as a key stroke from an input device, receipt of an external signal, an interrupt signal, a frame pulse, a channel pulse, or some particular piece of data to arrive from another part of the processor or from the equipment of which the processor is a part. As can be seen from FIG. 2 and the foregoing description, a loop is characterized by the lack of a match between the received input data and that of the mask which causes the processor to "jump" to an earlier instruction 102 in the sequence of instructions that the processor is executing. Accordingly, this "jump" is indicative of a processing loop, i.e. a sequence of instructions that are repeatedly executed.

The digital processor of FIG. 1 also includes a Shift Register Bank (SRB) 24 into which the instructions fetched from RAM 12 are also inputted or stored under conditions to be described below. SRB 24 has a word length selected to be the same as the length of the words retrieved from the RAM 12 and has a "depth", i.e. the number of words in its storage capacity, that is selected in relation to the number of steps expected to be in a loop. While one cannot always be certain as to how many steps will be in any particular loop, an experienced designer of ordinary skill will understand that a range of numbers of instruction words will be encountered and will select the depth of SRB 24 accordingly. In a typical processor, a depth of between 5 and 10 instruction words (i.e., shift register stages) is often adequate, however, a greater depth of perhaps 15 to 20 words may be equally convenient. It is understood that a greater depth of SRB 24 may be employed in a controller for a general purpose processor or microprocessor where there may be less certainty of the number of instructions in the largest loop and that a lesser depth may be employed in a special purpose processor such as a digital signal processor where the number of instructions in the loops may be known with greater certainty.

Shift Register Bank (SRB) 24 is controlled by signals from memory management unit (MMU) 20. In particular, a shift enable signal SH_EN enables SRB 24 to receive data word inputs from RAM 12 and to shift those data words into its register banks. Each data word shifted into SRB 24 is shifted into the first or input stage registers thereof, and then to the second stage registers thereof when a subsequent data word is shifted into the first stage, and then to subsequent or "deeper" stage registers and so forth until they reach the last or N-th stage registers, i.e. the stage most remote from the first or input stage. As each additional data word is shifted into shift register bank 24, the data stored in the N-th stage thereof is shifted out and is lost. Enable Signal CE1 enables SRB 24 to produce as its output that data word stored in the stage of shift register 24 corresponding to the shift register read out address SRB_ADDR provided from MMU 20.

MMU 20 further provides a memory enable signal MEM_EN that enables RAM 12 to produce at its output those instructions (data words) stored in its memory register having an address corresponding to that specified by the memory address signal MEM_ADDR also provided by MMU 20. Memory Management Unit 20 includes inter alia a state tracking machine (STM) 210 responsive to indications that control 16 has decoded certain jump commands, in particular, a "JMP+" command, a "JMP−" command and the target address JMP_ADDR to which the aforementioned jump commands direct the processor.

In operation of the processor of FIG. 1, RAM 12 is enabled by memory enable signal MEM_EN and MMU 20 generates a sequence of memory address signals MEM_ADDR, typically a series of numbers in ascending sequence, which causes RAM 12 to fetch to instruction register 14 the sequence of instructions corresponding to that sequence of memory addresses. MMU 20 also generates the shift enable signal SH_EN which enables shift register bank 24 to shift into its registers the instructions produced at the output of RAM 12. On each cycle, another word of instruction data is produced by RAM 12 and is inputted (shifted) into the first stage of SRB 24 as the most recent word in the shift register, and the word previously stored therein is shifted into the second register, that in the second register is shifted into the third register, and then to the next register as the process continues. Accordingly, the SRB 24 will include N words, where N is the depth of the SRB in number of stages, which will contain the data words that correspond to the last N instructions executed by the processor. This operation continues and the digital processor 10 executes instructions produced by PAM 12 until a loop condition is decoded by control 16.

This condition wherein the digital processor of FIG. 1 is reading or fetching instructions from RAM 12 into instruction register 14 and shift register bank 24 is referred to herein as the "non-mapping" mode or "non-mapping" state and the condition (described below) wherein instructions to be executed are being fetched from shift register SRB 24 and not from RAM 12 is referred to herein as the "mapping" mode or "mapping" state.

As previously mentioned, a loop is indicated from the instructions being executed calling for a jump command JMP– indicating a jump to an instruction having a prior position in the sequence of instructions. The decoding of the JMP– command by control 16 causes MMU 20 to change its output signals before the next instruction is fetched, i.e. to enter the mapping state. Specifically, enable signals SH__EN and the MEM__EN are both changed to their unenabled condition thereby stopping the shifting of instructions into SRB 24 and the reading out of instructions from RAM 12, whereby the power necessary to address and read out RAM 12 will not be consumed. Consistent therewith, MMU 20 generates CE1 to enable the instructions stored in the registers of SRB 24 to be produced at its output in accordance with the SRB read out address SRB__ADDR generated by MMU 20. The most recent instruction stored in SRB 24 is in the first stage register thereof, the second most recent instruction is stored in the second stage register thereof, the third most recent instruction is stored in the third stage thereof and the N-th most recent instruction is stored in the N-th stage thereof. The SRB__ADDR is a number corresponding to the number of the stage of the shift register. For example, if the JMP__ADDR specified in the JMP– instruction is, in the sequence of instructions being executed as a loop, five addresses prior to the address of the JMP– instruction, the MMU 20 will subtract that instruction address from the address of the last instruction that was executed and produce a difference of five which will then be employed to generate the SRB__ADDR to fetch the first instruction in the loop from the fifth stage of the shift register bank 24. After that instruction is fetched to instruction buffer IR 14 and is decoded by control 16 and executed, the next instruction in the loop to be repeatedly executed, which is the fourth most recent instruction stored in is SRB 24, will be fetched as a result of MMU 20 generating an SRB__ADDR of four to read out the forth stage of SRB 24, followed by MMU 20 generating an SRB__ADDR of three to read out the third register of SRB 24, and so forth until the first register thereof is read out. The instruction in the first register, however, is the JMP– instruction again calling for execution of the instruction having the JMP__ADDR address which will again, when fetched to instruction register IR 14, be decoded by control 16 and inputted to NMU 20, whereupon MMU 20 remains in the mapping state and again begins the sequence of fetching the prior instructions from SRB 24 by generating the sequence of SRB__ADDR addresses beginning with that corresponding to the jump address JMP__ADDR until it again reaches the highest address, i.e. that of the JMP– instruction.

As can be appreciated from the foregoing description, a controller for a digital processor according to the present invention will automatically detect the presence of a loop from the execution instructions of the micro-code program as they are executed and will map the appropriate instructions into a register such as a shift register bank from which they will be executed whilst the processor is in such loop. As a result, the full benefit of the present invention is available without any special programming, command or cognisance on the part of the programmer or designer, and indeed irrespective of whether the programmer or designer is even aware of the power saving feature of the processor.

As used herein, an "execution instruction" means an instruction that specifies an operation that is to be performed by the digital processor in its execution or arithmetic unit as contrasted to a "special instruction" that specifies to the controller characteristics of the loop to be performed, such as the number of steps in the loop, the number of times the loop is to be performed, or the addresses of the beginning and/or ending instructions of the loop.

Thus, the controller of the present invention does not require additional special instructions either preceding or following a loop to specify the start or end points of the loop, or the number of instructions in the loop, or the number of times the loop is to be performed; but rather the controller determines the presence of a loop automatically from the executable micro-code instructions that execute the loop.

The operation of memory management unit 20 will now be described in relation to the diagram of FIG. 3. In memory management unit 20, program counter (PC) 202 generates an increasing sequence of numbers that correspond to the program steps. This sequence of numbers also corresponds to the addresses at which instructions are stored in RAM 12 and so are transmitted to RAM 12 as the memory address signal MEM__ADDR. If a jump instruction (JMP– or JMP+) is decoded by control 16, the jump address JMP__ADDR specified therein is loaded into program counter 202 to replace the then-existing program address and program counter 202 then counts up from that substituted jump address JMP__ADDR to generate an increasing sequence of instruction addresses therefrom. State tracking machine (STM) 210 receives from control 16 the signals indicating detection of a jump instruction (JMP– or JMP+) as well as the jump address JMP__ADDR specified by such command. In addition, state tracking machine 210 also receives the current instruction address ADDR as generated by program counter 202.

State tracking machine 210 generates signals that control operation of other portions of memory management unit 20 and of shift register bank 24 of digital controller 10. In particular, STM 210 generates counter enable signal CN__EN which enables counter 222 to count, counter reset signal CN__RST which resets the counter 222 to zero, load enable signal LD__EN which enables high address register 220 to store (load) the value of the present instruction address ADDR when enabled, and shift enable signal SH__EN which, in addition to enabling shift register bank 24, is employed by logic circuits 234 and 236 to generate chip enable signal CE1 and memory enable signal MEM__EN to control shift register bank 24 and random access memory 12, respectively.

Figure 3:
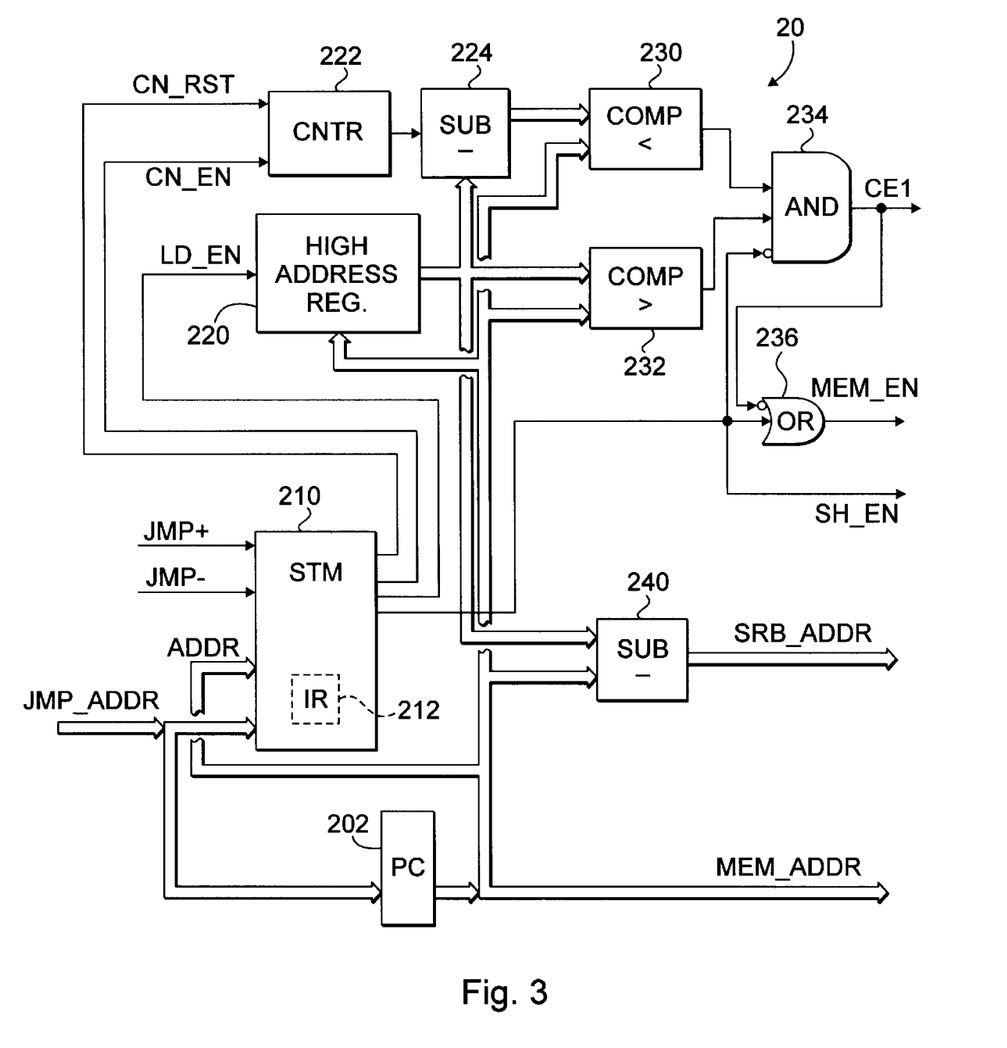
FIG. 3 is a schematic block diagram of an embodiment of a memory control useful with the embodiment of FIG. 1.
Figure 4:
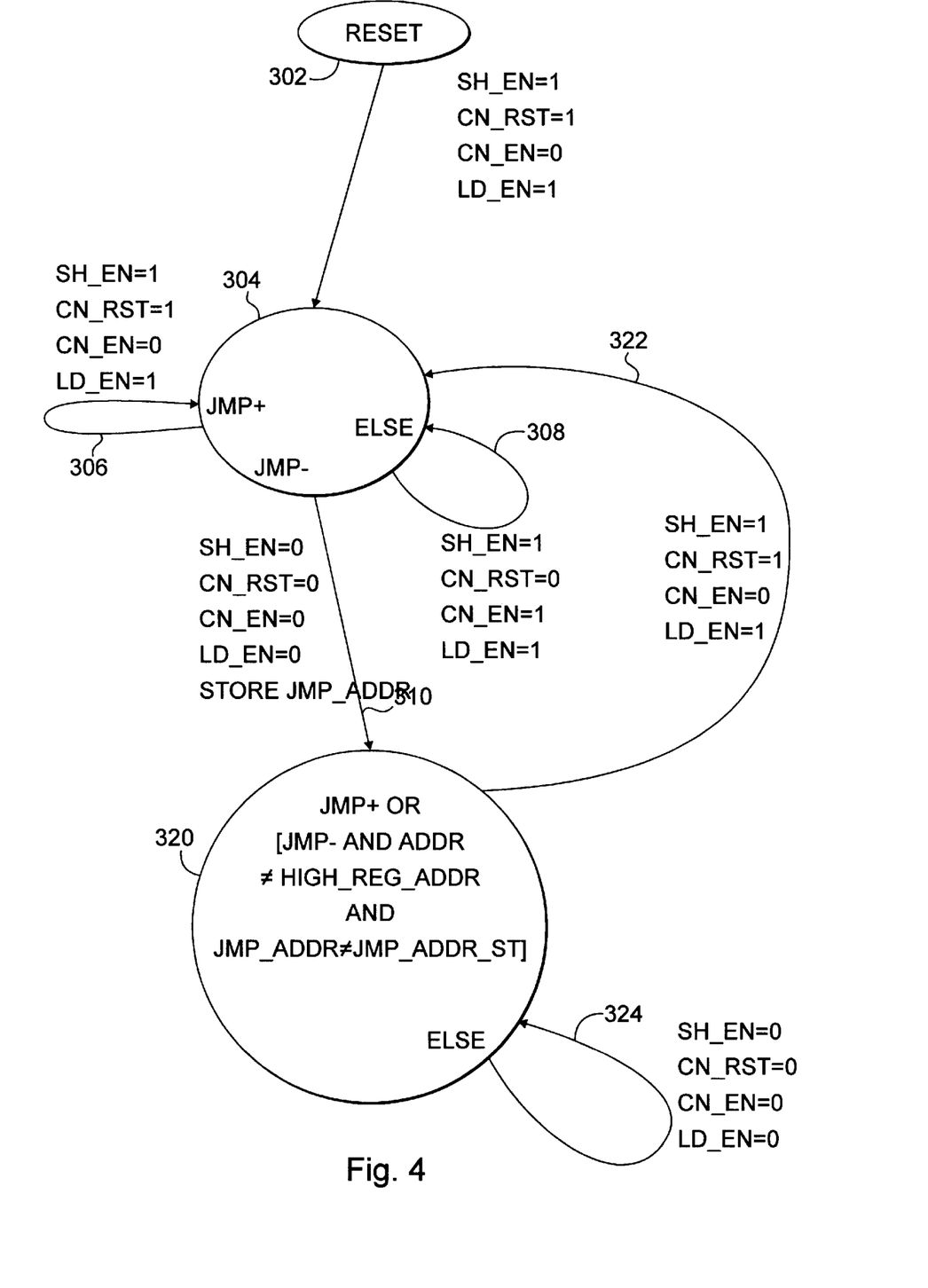
FIG. 4 is a state diagram showing the operation of a portion of the embodiment of FIG. 3.

Operation of state tracking machine 210 may best be understood with reference to the state diagram shown in FIG. 4 in conjunction with FIG. 3. At the reset or initialization state 302, shift register enable signal SH__EN is enabled so that instructions from RAM 12 are fetched into shift register bank 24 when they are fetched into instruction register 14, counter reset CN__RST is active and counter enable CN__EN is disabled so that counter 222 is reset to zero and does not count, and load enable LD-EN is enabled so that high address register 220 is loaded with the address ADDR of the instruction presently being executed, i.e. that produced by program counter 202, as the system moves into the non-mapping state 304. In the non-mapping state 304, decoding of a jump back JMP− instruction by control 16 indicates that a loop is being executed and has been detected by control 16. For purposes of description, consider first the other conditions of the non-mapping state. If a jump ahead JMP+ instruction is decoded by control 16, it is not an indication of a loop and tracking machine 210 follows track 306 to remain in the non-mapping state 304 with the same conditions of the shift enable signal SH__EN, counter reset signal CN__RST, counter enable CN__EN and load enable LD__EN signals as established in the reset condition or reset state 302. If any other instruction is decoded by control 16, as indicated by "else", track 308 keeps the program in the non-mapping state 304 but with the counter reset CN__RST disabled and the counter enable CN__EN enabled so that counter 222 counts the number of instructions thereafter stored in shift register bank 24. In this state, which is the normal execution condition when the digital processor is not executing a loop, instructions to be executed are being fetched from RAM 12 to instruction register 14 and SRB 24 and the address of the current instruction generated by program counter 202 is being stored in high address register 220 of memory management unit 20. As thus far described, shift enable signal SH__EN is in the enabling condition to enable shift register bank 24 and so is applied to AND gate 234 through an inverting input (as indicated by the circle at the input to AND gate 234) so that enable CE1 must be disabled. The application of shift enable signal SH__EN to OR gate 236 must produce a true condition at its output so that memory enable signal MEM-EN enables RAM 12 from which instructions to be executed are able to be fetched.

Returning to FIG. 4, when a jump back JMP− instruction is decoded by controller 16 state tracking machine 210 moves along track 310 from non-mapping state 304 to mapping state 320. This change from the non-mapping 304 to the mapping state 320 causes changes in the shift enable SH__EN, the counter reset CN-RST and the load enable LD__EN signals to their respective disabled states. With these signals all in the disabled condition: shift register bank 24 retains the last up to N instructions (where N is the number of stages in shift register bank 24) that had been fetched from RAM 12, counter 222 holds the number then stored therein which corresponds to the number of valid instructions (up to N) that are stored in shift register bank 24, and high address register 220 stores the address of the last instruction that was executed, i.e. the address of the jump back JMP− instruction, and the target address JMP__ADDR is stored in register 212 of state tracking machine 210 as JMP__ADDR__ST.

In the mapping state 320, with shift enable SH__EN disabled, AND gate 234 and OR gate 236 are able to respond to the other inputs thereto. When the jump target address JMP__ADDR specified by the jump back instruction JMP− is within the range of instructions stored in shift register bank 24, operation proceeds as follows: the high address stored in high address register 220 is applied to subtraction unit 224 in which the number stored in counter 222 is subtracted therefrom. Accordingly, the output of subtractor 224 is the address of the one of the sequence of valid instructions most recently stored in SRB 24 that has the lowest address in that sequence, i.e. it is the valid instruction that is most deeply stored in shift register bank 24. If the lowest valid address of the instructions stored in shift register bank 224 is less than the present address, then it is acceptable to enable RAM 12 and SRB 24 in the mapping state 320. This determination is made by comparator 230 which produces a true output if the address of the instruction in shift register bank 24 having the lowest valid address is less than the present address produced by program counter 202. Comparator 232 compares the high address stored in high address register 220 with the present instruction address generated by program counter 202 and, if the high address stored in register 220 is greater than the present address, then the output of comparator 232 is true indicating that the controller is possibly in a loop and that the mapping may proceed if the instruction required is within the range of those stored in shift register bank 24. With the output of comparators 230 and 232 being true, and with shift enable signal SH__EN being untrue (disabling), AND gate 234 produces a true output in the mapping state to generate a chip enable signal CE1 to enable shift register bank 24 to produce at its output the instructions stored therein in accordance with the shift register address signal SRB__ADDR. Shift register address signal SRB__ADDR is generated by subtractor 240 subtracting the address of the present instruction produced by program counter 202 from the high address stored in high address register 220. Because chip enable signal CE1 is enabled, AND gate 234 applies a true signal to the inverting input (as indicated by the circle) of OR gate 236 which produces a memory enable signal MEM__EN that is not enabling of RAM 12. As a result, instructions are fetched from shift register bank 24 so long as state tracking machine 210 and controller 10 remain in the mapping state 320.

It is important to note that if the jump target address JMP__ADDR is outside the range of valid instructions stored in SRB 24, it is not acceptable to enable the mapping operation wherein instructions are fetched from shift register bank 24. When the JMP__ADDR is outside the range of SRB 24, the output of comparator 230 will not be true and AND gate 234 will hold chip enable CE1 to shift register bank 24 in a disable condition and OR gate 236 will hold memory enable signal MEM__EN in an enable condition so that the addressed instruction will be fetched from memory 12. At any time when the instruction called for by program counter 202 has an address within the range of the instructions stored in shift register bank 24, comparators 230 and 232 will produce true outputs as described above, which will result in shift register bank 24 being enabled to fetch the instructions stored therein in accordance with the shift register address signal SRB__ADDR specified.

In this manner, the shift register bank 24 becomes the source of instructions to be executed whenever the instructions in the shift register bank 24 are called for by program counter 202, whereby random access memory 12 is not accessed anytime there is a valid instruction stored in shift register bank 24 that can be fetched and so power consumption tends to be minimized under any condition of loops. All this is done in response to execution instructions without need for any special instruction and without any action being required of or taken by the programmer.

Returning again to FIG. 4, system 10 and state tracking machine 210 remain in the mapping state 320 unless certain instruction decoding conditions are satisfied. If these conditions are not satisfied, state tracking machine 210 determines an "else" condition 324 which retains state tracking machine 210 in the mapping state 320 with the shift enable signal SH__EN, counter reset signal CN__RST, counter enable signal CN__EN, and load enable signal LD__EN all in the disabled state. This condition corresponds to the condition that obtains as a result of the jump from non-mapping state 304 to mapping state 320 along path 310.

The conditions which cause state tracking machine 210 to exit mapping state 320 are those in which the present instruction loop is no longer active. These include the condition where a jump forward JMP+ instruction is decoded by control 16 indicating that the processor is either not in a loop or has jumped out of a loop. In addition, state tracking machine 210 will exit mapping state 320 along path 322 to non-mapping state 304 if a different loop is detected by control 16. This occurs when another (more recent) jump back JMP− instruction is decoded by control 16 and the address ADDR of the more recent jump back JMP− instruction differs from the address HIGH_REG_ADDR stored in the high address register 220 for the previous jump back JMP− instruction and the jump target address JMP_ADDR specified by the more recent jump back JMP− instruction is different from the jump target address JMP_ADDR of the jump instruction of the previous loop instruction. To this end, state tracking machine 210 includes internal registers 212 into which the instruction address ADDR and jump target address JMP_ADDR specified in the jump back JMP− instruction loop being mapped is stored, which stored address and stored jump address are indicated by ADDR_ST and JMP_ADDR_ST, respectively. If the next (after the first) jump back JMP− instruction decoded by control 16 does not have the same jump instruction address ADDR as the previously detected jump back JMP− instruction ADDR_ST and does not have the same jump target address JMP_ADDR as that JMP_ADDR_ST of the previously detected jump back JMP− instruction, then state tracking machine 210 moves from mapping state 320 along path 322 to non-mapping state 304 and controller 10 reverts to loading instructions from memory 12 into instruction register 14 and into shift register bank 24. Note that if the next detected jump back instruction JMP− has the same instruction address as the ADDR_ST of the previous JMP− instruction, then the instructions then stored in shift register bank 24 are valid instructions with respect to the prior detected loop as well as the next detected loop and so controller 10 may continue in the mapping state 320 of state tracking machine 210. Similarly, if the jump target address JMP_ADDR_ST of the prior detected jump back JMP− instruction is the same as the jump address JMP_ADDR of the presently detected jump back JMP− instruction, then the instructions deepest in shift register bank 24 are likely to be valid instructions with respect to the next detected loop and the system can continue in the mapping state 320. Also note that the values of ADDR_ST and HIGH_REG_ADDR are the same.

The foregoing decision condition may be expressed in equation form as follows for non-mapping state 304:

If JMP−, Then go to Mapping State 320;
Else, remain in Non-Mapping State 304, and as follows for mapping state 320:

If (JMP+) or
(JMP− and ADDR≠HIGH_REG_ADDR
and JMP_ADDR≠JMP_ADDR_ST),
Then go to Non-Mapping State 304;
Else, remain in Mapping State 320.

Alternatively, other criteria may be employed by state tracking machine 210 to determine when to change from mapping state 320 to non-mapping state 304. For example, state machine 210 could exit mapping state 320 upon detection of a jump forward JMP+ instruction or of a jump back JMP− instruction having a different instruction address ADDR. In other words, if the present jump back JMP− instruction has the same address ADDR as the previously detected jump back JMP− instruction, then it must be the same instruction and processor 10 should remain in mapping state 320.

In equation form, the decision condition is as follows for mapping state 320:

If (JMP+) or
(JMP− and ADDR≠HIGH_REG_ADDR),
Then go to the Non-Mapping State 304;
Else, remain in Mapping State 320.

In many instances, if not most instances, this decision condition may provide more efficient processing in a multiple loop wherein a loop having fewer instructions is nested within a loop having more instructions.

Another alternative criteria is to remain in the mapping state 320 if a present jump back JMP− instruction has either the same instruction address ADDR or the same target address JMP_ADDR as that of the previously detected jump back JMP− instruction. In equation form, the decision condition is as follows for mapping state 320:

If (JMP+) or
(JMP− and (ADDR≠HIGH_REG_ADDR
or JMP_ADDR≠JMP_ADDR_ST)),
Then go to Non-Mapping State 304;
Else, remain in Mapping State 320.

In many instances, this decision condition may provide more efficient processing of loops with the same target address because much, if not all, of the instructions for the loop ending in the present jump back JMP− instruction, i.e. those having addresses between the address ADDR of the jump back JMP− instruction and the target address JMP_ADDR) will already have been stored in shift register bank 24.

Accordingly, a digital processor control according to the present invention includes a memory 12 adapted to store instructions to be executed wherein the instructions may include at least one sequence of instructions that are to be executed more than one time. Memory 12 is responsive to a first control signal MEM_EN, MEM_ADDR to produce ones of stored instructions in accordance with the first control signal MEM_EN, MEM_ADDR. A register 24 is coupled to memory 12 to store a sequence of instructions produced by the memory 12, and the register 24 is responsive to a second control signal CE1, SRB_ADDR to produce ones of the sequence of instructions stored therein. Control device 16 detects or decodes ones of the instructions produced by the memory 12 and the register 24 that are an executable instruction that initiates repetition of the sequence of instructions that are to be executed more than one time. State machine 210 is responsive to the control device 16 for generating the first control signal MEM_EN, MEM_ADDR, SH_EN when instructions to be executed more than one time are not detected by control 16 and for generating the second control signal, CEI, SRB_ADDR when the instructions to be executed more than one time are detected.

A digital controller 10 comprises an addressable memory 12 to produce instructions when enabled MEM_EN, MEM_ADDR and a shift register 24 to store instructions SH_EN produced by the addressable memory 12 and to produce the stored instructions when enabled CE1, SR_ADDR. A controller 16 decodes executable instructions produced by the addressable memory 12 and the shift register 24, wherein the decoded instructions JMP−, JMP+, JMP_ADDR include jump-back JMP− instructions and jump-forward JMP+ instructions. An instruction address ADDR and a target address JMP_ADDR is associated with each jump-back JMP− and jump-forward JMP+ instruction.

A memory control 20 has a mapping state 320 in which the shift register 24 is enabled SH_EN and a non-mapping state 304 in which the addressable memory 12 is enabled MEM_EN. The memory control 20 is responsive to the controller 16 to take the mapping state 320 when a jump-back JMP− instruction is decoded 16 and to take the non-mapping state 304 when a jump-forward JMP+ instruction is decoded 16.

A method for reducing power consumption in a digital processor 10 comprises the steps of:

producing from a memory 12 a sequence of executable instructions to be executed, including a shorter sequence of executable instructions 102, 104, 106 to be repetitively executed;

storing SH_EN in a register the shorter sequence of executable instructions 102, 104, 106 to be repetitively executed;

decoding 16 ones of the sequence of executable instructions that are jump-back JMP− instructions;

disabling MEM_EN, 310 in response to decoding 16 of the jump-back JMP− instruction the memory 12 from producing MEM_EN, MEM_ADDR further instructions in the sequence of executable instructions; and producing CE1, SRB_ADDR in response to the decoding 16 of the jump-back JMP− instruction from the register 24 and executing ones of the shorter sequence of executable instructions 102, 104, 106 stored therein.

While the present invention has been described in terms of the foregoing exemplary embodiment, variations will be apparent to those of skill in the art within the scope and spirit of the present invention which is defined by the claims following. For example, register 24 could be implemented with a random access memory instead of with a bank of shift registers, although this would complicate slightly the operation of storing data instructions into that register 24 when the control 10 is in the non-mapping state. Random access memory 12 could be a synchronous random access memory which can be disabled from producing at its output the data stored therein by an enable signal MEM_EN or by stopping the clock signal applied thereto. Memory 12 could be an asynchronous random access memory which could be kept from producing at its output the data stored therein by an enable signal MEM_EN or by keeping the memory address MEM_ADDR applied thereto unchanged. Memory enable signal MEM_EN in effect performs that latter function within memory 12 wherein AND gates having as one of their inputs memory enable signal MEM_EN would control the application of memory address MEM_ADDR to the random access memory and/or would block the output sense amplifiers through which instructions and other data are read out of such memory. In each of the foregoing examples in this paragraph, a person of skill in the art knows how to configure the memory output circuits to avoid memory output conflicts.

For example, it is noted that the foregoing descriptions are for random access memory 12 and shift register bank 24 in which their respective outputs are of the tri-state type, i.e. ones that provide a high-level or a low-level output signal when active and enabled, but that appear as an open circuit when not enabled.

Note that the controller including the present invention automatically processes instructions for single loops as well for multiple and nested loops. In the case of a nested loop, for example, the execution of instructions fetched from RAM 12 will proceed along until the jump back JMP− instruction of the inner loop is executed at which time the state tracking machine 210 will put the controller 10 into the mapping state 320 and that inner loop will be repeatedly executed by executing instructions fetched from shift register bank 24 until such time as the loop condition 106 is satisfied 110. Thereafter, the execution of instructions proceeds in the mapping state 320 with instructions fetched from memory 12 according to increasing instruction addresses outside the range of those stored in SRB 24. When the jump back JMP− instruction of the second or outer loop is detected, state tracking machine 210 keeps controller 10 in the mapping mode 320 unless both the instruction address ADDR and the jump target address JMP_ADDR of the JMP− instruction for the inner and outer loops are not the same. To the extent that the depth N of shift register bank 24 is sufficient to include instructions that are part of the inner loop or the outer loop, the instructions to be executed are fetched from shift register 24, i.e. to the extent that they are within the range of instructions stored in SRB 24 which are monitored by the comparators 230, 232 and the gating logic 234, 236, as previously described in relation to FIG. 3. In the case where both the instruction address ADDR and the jump target address JMP_ADDR for the outer loop differ from the corresponding addresses for the inner loop, controller 10 reverts to the non-mapping state 304, whereupon instructions for the outer loop and the inner loop are loaded into SRB 24.

With multiple loops to be executed serially, the execution of instructions proceeds down to the jump back JMP− instruction of the first loop, at which time state tracking machine 210 places control 10 in the mapping state 320 until the conditions of that loop are satisfied. Thereafter the execution of instructions proceeds with increasing instruction addresses until the jump back JMP− instruction of the second loop to be executed, the one that follows the first loop, is decoded by control 16. At this time, state tracking machine 210 responds to the values of ADDR, ADDR_ST, JMP_ADDR and JMP_ADDR_ST to either keep the control 10 in the mapping state 320 or to place it in the non-mapping state 304 until instructions from the second loop are shifted into SRB 24, all as previously described.

What is claimed is:

1. A digital processor control comprising:

a memory adapted to store execution instructions to be executed, wherein such execution instructions may include at least one sequence of execution instructions that are to be executed more than one time, and said memory is responsive to a first control signal to produce ones of the stored execution instructions in accordance with said first control signal;

a register having at least N stages where N is a positive integer, wherein said register is coupled to said memory to store the ones of the stored execution instructions produced by said memory, and said register is responsive to a second control signal to produce ones of the N most-recently produced execution instructions stored therein;

whereby the N most-recently produced execution instructions are stored in said register without any special instruction therefor;

a control device for detecting each of the execution instructions produced by said memory and said register that is a jump-back instruction that initiates repetition of the sequence of execution instructions that are to be executed more than one time; and a state machine responsive to said control device for generating said second control signal when an execution jump-back instruction is detected and for generating said first control signal when execution instructions to be executed more than one time are not detected, whereby the sequence of instructions that are to be executed more than one time are produced for execution from said register following the jump-back instruction.

2. The control of claim 1 wherein execution instructions are executed in a predetermined order and the jump-back instruction that initiates repetition detected by said control device is a first execution instruction to jump to an execution instruction having a position in said predetermined order that is prior to that of the jump-back instruction.

3. The control of claim 2 wherein said state machine generates said second control signal in response to the jump-back instruction to jump to an execution instruction having a prior position in said predetermined order.

4. The control of claim 2 wherein said predetermined order is an ascending numerical sequence and the prior position in said predetermined order is represented by a lower number.

5. The control of claim 2 wherein said control device further detects ones of the execution instructions produced by said memory and said register that are an execution instruction to jump to an execution instruction having a later position in said predetermined order.

6. The control of claim 5 wherein said state machine generates said first control signal in response to the execution instruction detected by said control device to jump to an execution instruction having a later position in said predetermined order.

7. The control of claim 2 wherein said state machine generates said first control signal in response to detection by said control device of a second jump-back instruction to jump to an execution instruction having a prior position in said predetermined order when the prior position to be jumped to of said second jump-back instruction is different than the prior position to be jumped to of the first jump-back instruction.

8. The control of claim 2 wherein said state machine generates said first control signal in response to detection by said control device of a second jump-back instruction to jump to an execution instruction having a prior position in said predetermined order when the position of said second jump-back instruction in said predetermined order is different than the position of the first jump-back instruction in said predetermined order.

9. The control of claim 1 wherein said register includes a shift register that is enabled to store execution instructions from said memory when said second control signal is not generated.

10. The control of claim 9 wherein said shift register produces shifted execution instructions stored therein at its output in response to said second control signal.

11. The control of claim 1 wherein said register includes a shift register and wherein said state machine generates a shift register enable signal to enable said shift register to store execution instructions therein when execution instructions to be executed more than one time are not detected and wherein said first control signal is responsive to said shift register enable signal.

12. The control of claim 1 wherein said register includes a shift register and wherein said state machine generates a shift register enable signal to enable said shift register to store execution instructions therein when execution instructions to be executed more than one time are not detected and wherein said second control signal is responsive to said shift register enable signal.

13. A control for a digital processor comprising:

an addressable memory adapted to store at locations having addresses execution instructions to be executed, wherein such execution instructions may include at least one sequence of execution instructions that are to be executed more than one time, and said addressable memory is responsive to a memory control signal including a memory address to produce ones of the stored execution instructions in accordance with said memory control signal;

a register having at least N stages where N is a positive integer, wherein said register is coupled to said addressable memory to store the ones of the execution instructions produced by said addressable memory and is responsive to a register control signal including a register address to produce at its output ones of the N most-recently stored execution instructions stored therein;

whereby the N most-recently produced execution instructions are stored in said register without any special instruction therefor;

a control device for decoding executable jump-back instructions produced by said addressable memory and said register for controlling the digital processor; and a memory control including a state machine responsive to the decoded executable jump-back instructions from said control device for generating said memory control signal when execution instructions to be executed more than one time are not decoded by said control device and for generating said register control signal when an executable jump-back instruction is decoded by said control device, whereby the sequence of instructions that are to be executed more than one time are produced for execution from said register following the jump-back instruction.

14. The control of claim 13 wherein execution instructions are executed in a predetermined order and the executable jump-back instruction that is decoded by said control device is an execution instruction to jump to a memory address having a position in said predetermined order that precedes the memory address of the then-decoded executable jump-back instruction.

15. The control of claim 14 wherein said state machine generates the register control signal in response to the executable jump-back instruction to jump to a memory address having a position in said predetermined order that proceeds that of the then-decoded executable jump-back instruction.

16. The control of claim 15 wherein the register address is generated from the memory address that is to be jumped to.

17. The control of claim 14 wherein said predetermined order includes an ascending numerical sequence of memory addresses and the prior position in said predetermined order is represented by a lower value memory address.

18. The control of claim 14 wherein said control device further decodes ones of the execution instructions produced by said addressable memory and said register that are an execution instruction to jump to a memory address that follows that of the then-decoded execution instruction in said predetermined order.

19. The control of claim 18 wherein said state machine generates said memory control signal in response to the execution instruction decoded by said control device to jump to a memory address that follows the memory address of the then-decoded execution instruction in said predetermined order.

20. The control of claim 19 wherein the memory address included in said memory control signal is the memory address that is to be jumped to.

21. The control of claim 14 wherein said state machine generates said memory control signal in response to detection by said control device of a further executable jump-back instruction to jump to a memory address having a prior position in said predetermined order when the memory address to be jumped to of said further executable jump-back instruction is a different memory address from the memory address to be jumped to in accordance with a previously-decoded executable jump-back instruction.

22. The control of claim 14 wherein said state machine generates said memory control signal in response to detection by said control device of a further executable jump-back instruction to jump to a memory address having a prior position in said predetermined order when the memory address of said further executable jump-back instruction is different from the memory address of a previously-detected executable jump-back instruction.

23. The control of claim 13 wherein said register includes a shift register that is enabled to store execution instructions from said addressable memory when said register control signal is not generated.

24. The control of claim 23 wherein said shift register produces shifted execution instructions stored therein at its output in response to said register control signal.

25. The control of claim 13 wherein N is an integer between 5 and 15.

26. A digital signal processor control comprising:
  a random access memory having a plurality of addressable storage locations having corresponding addresses adapted to store therein execution instructions to be executed, wherein such execution instructions may include at least one sequence of execution instructions that are to be executed more than one time, and said random access memory being responsive to memory enable and memory address signals to selectively produce ones of the stored execution instructions stored in locations corresponding to an address represented by said memory address signal;
  a shift register having at least N stages where N is a positive integer, wherein said shift register is coupled to said random access memory to store when enabled by a shift enable signal the ones of the execution instructions produced by said random access memory, and said shift register is responsive to a register enable signal and to a shift register address signal to produce at its output ones of the N most-recently produced execution instructions stored therein;
  whereby the N execution instructions most recently produced by said random access memory are stored in said shift register without any special instruction therefor;
  an instruction register adapted to store the execution instructions produced by said random access memory and said register;
  a control device for decoding ones of the execution instructions stored in the instruction register that are an executable jump-back instruction that initiates repetition of the sequence of execution instructions to be executed more than one time;
  a program counter for generating said memory address signals;
  a state tracking machine responsive to said control device for generating said shift enable signal to enable said shift register when execution instructions to be executed more than one time are not decoded by said control device and for generating a control signal when an executable jump-back instruction is decoded; and
  a shift register control responsive to said memory address signals and said control signal for generating said register address signal, said shift register control including gating logic responsive to said shift enable signal and to said memory address signal for generating said memory enable signal and said register enable signal,
  whereby the sequence of instructions that are to be executed more than one time are produced for execution from said shift register following the jump-back instruction.

27. The signal processor control of claim 26 wherein the executable jump-back instructions decoded by said control device are executable jump-back instructions to jump to a memory address having a lower value than the memory address of the then-decoded executable jump-back instruction.

28. The signal processor control of claim 27 wherein N is an integer having a value at least as great as the difference between the memory address of the then-decoded executable jump-back instruction and the memory address to be jumped back to.

29. The signal processor control of claim 28 wherein N is between 5 and 15.

30. The signal processor control of claim 27 wherein said state tracking machine is responsive to decoding of said executable jump-back instruction for generating said control signal.

31. The signal processor control of claim 30 further comprising an address register responsive to said control signal for storing the memory address of the executable jump-back instruction.

32. The signal processor control of claim 27 wherein said state tracking machine is responsive to the respective memory addresses of first and second executable jump-back instructions decoded at different times for generating said shift enable signal and for not generating said control signal when the respective memory addresses of the first and second executable jump-back instructions differ.

33. The signal processor control of claim 27 wherein said state tracking machine is responsive to the respective memory addresses to be jumped to of first and second executable jump-back instructions decoded at different times for generating said shift enable signal and for not generating said control signal when the respective memory addresses to be jumped to of the first and second executable jump-back instructions differ.

34. The signal processor control of claim 26 wherein said shift register control includes an address register responsive to said control signal for storing the memory address of the executable instruction decoded by said control device.

35. The signal processor control of claim 34 wherein said shift register control includes a comparator for comparing the memory address stored in said address register to the memory address of an execution instruction being executed for generating said register enable signal.

36. The signal processor control of claim 34 wherein said shift register control includes a subtractor for subtracting the memory address of an execution instruction being executed from the memory address stored in said address register for generating said shift register address signal.

37. The signal processor control of claim 34 wherein said shift register control includes:
  a counter for counting the number of execution instructions stored in said shift register; and a comparator responsive to said counter and to the memory address of an execution instruction being executed for generating said register enable signal.

38. The signal processor control of claim 26 wherein said control device decodes ones of the execution instructions that are jump-forward instructions to jump to a memory address having a higher value than the memory address of the then-decoded execution instruction.

39. The signal processor control of claim 38 wherein said state tracking machine is responsive to decoding of said jump-forward instruction for generating said shift enable signal and for not generating said control signal.

40. The signal processor control of claim 26 wherein:
   said control device decodes execution instructions including jump-back instructions and jump-forward instructions, each having an instruction address and a target address associated therewith; and
   said state tracking machine generates said control signal when said control device decodes a jump-back instruction and generates said shift enable signal when said control device decodes one of: (a) a jump-forward instruction and (b) a jump-back instruction having a different instruction address and a different target address than those of a previously-decoded jump-back instruction.

41. A digital controller comprising:
   an addressable memory for producing execution instructions when enabled;
   a shift register write-enabled for storing the execution instructions produced by said addressable memory and for producing only ones of the N most-recently stored execution instructions when read-enabled, where N is a positive integer;
   a controller for decoding the execution instructions produced by said addressable memory and said shift register, wherein the decoded execution instructions include jump-back instructions and jump-forward instructions, wherein an instruction address and a target address is associated with each jump-back and jump-forward instruction;
   a memory control having a mapping state in which said shift register is read-enabled and a non-mapping state in which said addressable memory is enabled, wherein said memory control is responsive to said controller to take said mapping state when a jump-back instruction is decoded and to take said non-mapping state when a jump-forward instruction is decoded,
   whereby the execution instructions produced by the addressable memory are contemporaneously executed and stored in said shift register in the non-mapping state, and are produced for execution from said shift register in the mapping state immediately following the jump-back instruction.

42. The digital controller of claim 41 wherein said memory control takes said non-mapping state when two successive jump-back instructions having different target addresses are decoded.

43. The digital controller of claim 41 wherein said memory control takes said non-mapping state when two successive jump-back instructions having different instruction addresses are decoded.

44. The digital controller of claim 41 wherein said memory control takes said non-mapping state when two successive jump-back instructions having different instruction addresses and having different target addresses are decoded.

45. The digital controller of claim 41 wherein said memory control when in the non-mapping state remains in the non-mapping state unless a jump-back instruction is decoded.

46. The digital controller of claim 41 wherein said memory control when in the mapping state remains in the mapping state unless one of: (a) a jump-forward instruction and (b) a jump-back instruction having a different instruction address and a different target address than a previously decoded jump-back instruction is decoded.

47. A method for reducing power consumption in a digital processor comprising the steps of:
   producing from a memory a sequence of execution instructions to be executed which includes at least one shorter sequence of execution instructions to be repetitively executed;
   executing the execution instructions produced from the memory;
   storing in a register the execution instructions as they are produced from the memory, whereby only the N most-recently executed execution instructions produced by the memory are stored in the register at any time, where N is a positive integer, wherein the N most recent execution instructions at times includes at least part of the shorter sequence of execution instructions to be repetitively executed;
   decoding each of the sequence of execution instructions that is a jump-back instruction;
   in response to decoding of the jump-back instruction, disabling the memory from producing further execution instructions in the sequence of execution instructions; and
   in response to the decoding of the jump-back instruction, producing from said register and executing ones of the last N execution instructions including the at least part of the shorter sequence of execution instructions stored therein.

48. The method of claim 47 further comprising the steps of:
   decoding ones of the sequence of execution instructions that are jump-forward instructions;
   in response to the decoding of a jump-forward instruction, disabling the producing from said register of execution instructions stored therein; and
   in response to the decoding of the jump-forward instruction, enabling the producing from said memory of the sequence of instructions stored therein.

49. The method of claim 47 wherein the step of storing in a register includes storing a sequence of N executable instructions in said register, where N is an integer of value greater than or equal to the number of execution instructions in said shorter sequence of execution instructions to be repetitively executed.

50. A digital processor control comprising:
   a memory adapted to store execution instructions to be executed, wherein such execution instructions may include at least one sequence of execution instructions that are to be executed more than one time, and said memory is responsive to a first control signal to produce ones of the stored execution instructions in accordance with said first control signal;
   a register having at least N stages where N is a positive integer, wherein said register is coupled to said memory to store the ones of the stored execution instructions produced by said memory, and said register is responsive to a second control signal to produce ones of the N most-recently produced execution instructions stored therein;

whereby the N most-recently produced execution instructions are stored in said register without any special instruction therefor;

a control device for detecting a produced execution instruction that is a jump-back instruction; and a state machine responsive to said control device for generating said second control signal when an execution jump-back instruction is detected and for generating said first control signal when execution instructions to be executed more than one time are not detected, whereby instructions that are to be executed more than one time are produced for execution from said register following the jump-back instruction.

* * * * *